J. ALLONAS, dec'd.,
M. D. HARTER, executor.
Traction Wheel.
No. 235,722.          Patented Dec. 21, 1880.
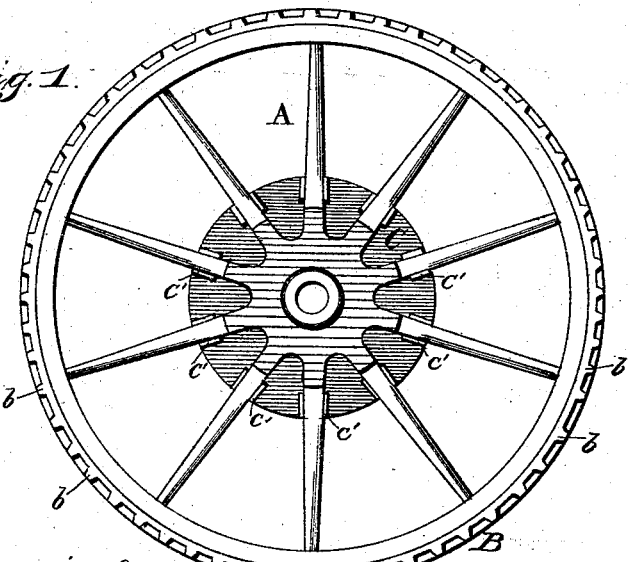
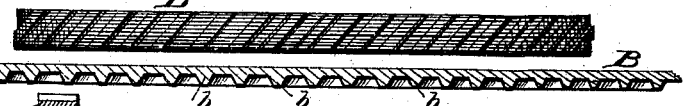
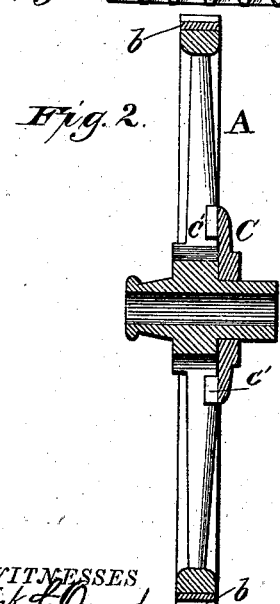
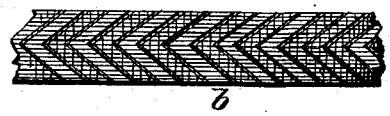
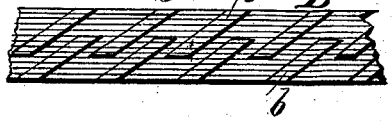
WITNESSES
Franck L. Armand
Alexander Mahon
INVENTOR
Joseph Allonas
by A. M. Smith
ATTORNEY

UNITED STATES PATENT OFFICE.

JOSEPH ALLONAS, DECEASED, OF MANSFIELD, OHIO; M. D. HARTER, EXECUTOR.

TRACTION-WHEEL.

SPECIFICATION forming part of Letters Patent No. 235,722, dated December 21, 1880.

Application filed February 5, 1879.

*To all whom it may concern:*

Be it known that I, JOSEPH ALLONAS, of Mansfield, county of Richland, State of Ohio, have invented certain new and useful Improvements in Traction-Wheels, of which the following is a full, clear, and exact description, reference being had to the accompanying drawings, making part of this specification, in which—

Figure 1 is a side view of my improved traction-wheel. Fig. 2 represents a vertical transverse section through the same. Fig. 3 is a plan view of the rim or tire. Fig. 4 represents a longitudinal vertical section through a portion of the tire; and Figs. 5 and 6 show modifications in the arrangement of the projecting ribs or "starts" formed on the outer face of the tire.

Similar letters of reference denote corresponding parts in all the figures.

The invention consists, first, in forming wrought-metal tire for traction-wheels with a flat, smooth, inner face, and an outer face formed in one with solid transverse ribs, which project from and are backed solidly by the full thickness of the body of the tire, as hereinafter set forth.

The invention further consists in the combination, with the traction-wheel, of a disk or plate having lateral ribs grasping the spokes midway between the hub and rim, for the purpose of relieving the spokes at their junction with the hub of a portion of the strain consequent upon the falling of the wheel into a rut or depression in the ground, as hereinafter explained.

In the accompanying drawings, A represents a traction-wheel, which, aside from the details hereinafter described, may be of any suitable construction adapting it to the purpose for which it is intended. Upon this wheel is secured a tire, B, of rolled or wrought iron, provided with projecting ribs or starts *b*, crossing the surface of the tire obliquely and arranged to overlap or pass one by the next succeeding one, as shown. These ribs or starts are formed upon the tire in the process of rolling the latter, and, by preference, are tapered or beveled outward to facilitate their formation upon the tire and their escape from the dies or depressions in the rolls by which they are formed. These ribs may extend obliquely entirely across the tire, as shown in Fig. 3, or they may extend obliquely from the opposite sides to the center, giving them a V shape, as shown in Fig. 5, or they may reach from opposite sides beyond the center, overlapping each other, as shown in Fig. 6.

Other arrangements of the ribs may be made; but those described are preferred, as by having them overlap or pass one by another, so as to give the enlarged periphery formed by them a continuous bearing, all jolting which would be consequent otherwise in the movement of the engine over hard or unyielding roads or surfaces is prevented. Those upon one traction-wheel should be arranged in opposite lines to those upon the opposite traction-wheel. In other words, if those upon one wheel extend backward and inward from the outer edge of the tire, those upon the tire of the traction-wheel on the opposite side of the machine or engine should also extend backward and inward, thus setting them opposing each other, this arrangement preventing the engine from slipping or being drawn sidewise.

C represents a metal disk or plate provided near its periphery, on its face adjacent to the wheel, with a series of ribs, *c'*, arranged in pairs and forming sockets for the reception of the spokes, which fit snugly therein at points midway between the hubs and the rim, as shown. These plates are secured to and move with the hubs, through which motion is imparted to the wheels for driving them, and when one of the wheels falls into a depression or deep rut the plate serves to relieve the spokes at their junction with the hub both of the lateral strain tending to "dish" the wheel and of the strain due to the additional power of the engine required to rotate the wheels out of such depression, and which would otherwise be thrown upon the spokes at that point, thus removing all danger of breaking the spokes at that point.

I would state that I am aware that traction-wheels have been provided with ribs or starts crossing the tire in oblique lines; but these have been either cast with the heavy cast-iron wheel or rim, and were unfit for use in extremely cold or frosty weather, when portable engines for agricultural purposes are mainly in demand; or, where wrought-iron tires were used, the ribs were made separate from and riveted to the tire—an operation both tedious and expensive. By my construction the tire can be rolled with the ribs formed upon it at very little added cost, merely such as would be due to the added metal, while at the same time, if the tire should become stretched or broken, it can be as readily cut and welded, or repaired and reset, as the tire of an ordinary wagon, and is adapted for use in all kinds of weather, having been found, in practice, to be particularly valuable in traveling over frozen roads and ice, where the action of the ribs or spurs was especially needed to prevent the slipping of the wheels.

Having now described my invention, what I claim as new, and desire to secure by Letters Patent, is—

1. A rolled wrought-metal tire for traction-wheels having a flat smooth inner face and an outer face formed in one, with solid transverse ribs which project from and are backed solidly by the full thickness of the body of the tire, as set forth.

2. The disk or plate C, to which rotary movement is imparted by the power of the engine, provided with lateral spurs or projections $c'$ $c'$, which grasp the spokes of the truck-wheel midway of its length between the hub and rim of said wheel and communicate the rotary movement of the plate to said wheel, substantially as described.

In testimony whereof I have hereunto set my hand this 25th day of January, A. D. 1879.

JOSEPH ALLONAS.

Witnesses:
J. M. YZNAGA,
ALEXANDER MAHON.